May 16, 1933.  N. A. CHRISTENSEN  1,909,043
COMPRESSOR APPARATUS
Filed March 15, 1929
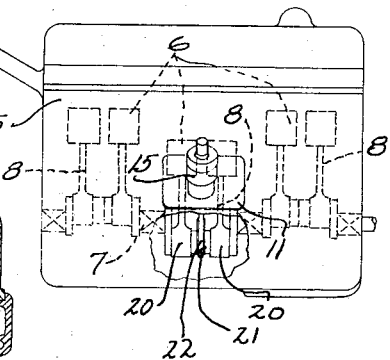
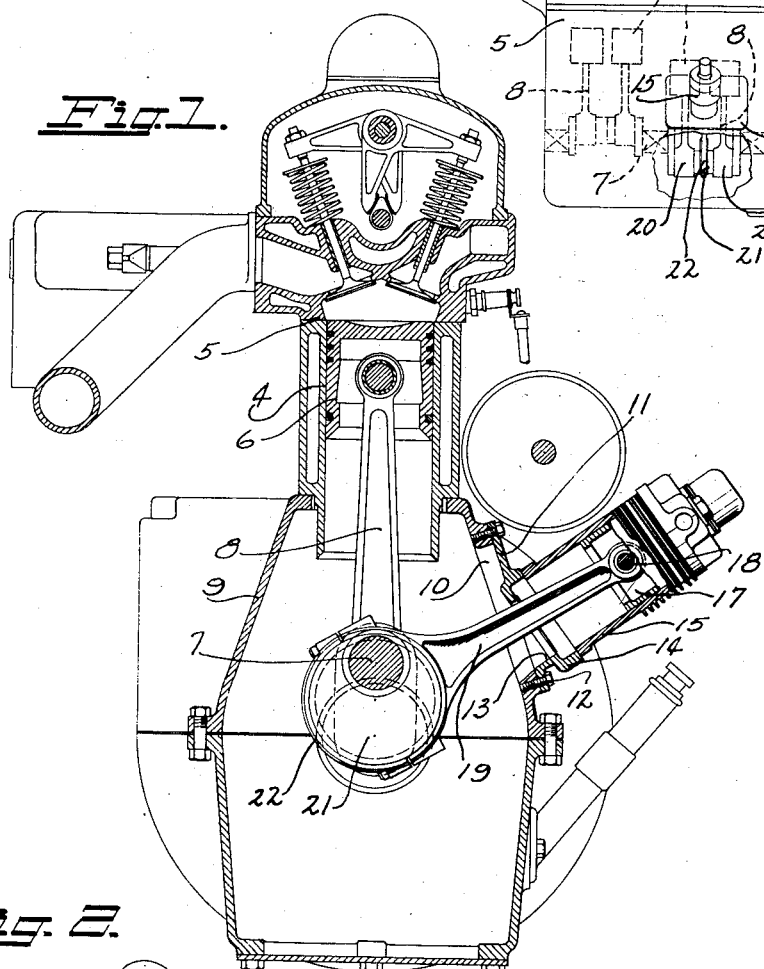
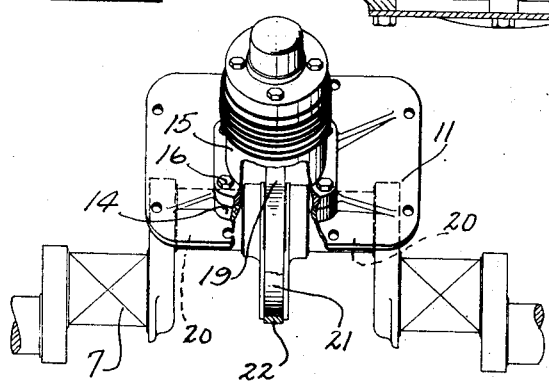
Inventor
Niels A. Christensen
by Marks & French
Attorney Patented May 16, 1933

1,909,043

UNITED STATES PATENT OFFICE

NIELS A. CHRISTENSEN, OF CLEVELAND, OHIO

COMPRESSOR APPARATUS

Application filed March 15, 1929. Serial No. 347,222.

The invention relates to automotive compressors for furnishing compressed air for the braking and/or starting systems of automotive vehicles.

Compressors of the type above described are subjected to heavy duty and I have found that the most satisfactory way of driving said compressors is direct from the crank shaft of the engine and in certain prior United States patents I have accomplished this by associating the compressor drive with the front end of the crank shaft. However, in certain engines now in use for automotive vehicles the form of drive above described does not lend itself to the design of the engine and the object of the present invention is to provide a compressor drive which may be readily applied to existing engine designs with the least possible change in the parts thereof. With this end in view, the invention consists in driving the compressor from an intermediate portion of the engine crank shaft and more particularly to form a drive connection on one of the cranks of a multicylinder engine between spaced cranks for the connecting rods of adjacent engine cylinders and to mount the compressor cylinder on the crank case of the motor and drive through a side opening in said case.

The invention further consists in the several features hereinafter described and more particularly defined by claims at the conclusion hereof.

In the drawing Fig. 1 is a vertical sectional view through an automotive engine embodying the invention;

Fig. 2 is a detail side elevation view of the compressor and its drive, parts being broken away and parts being shown in section;

Fig. 3 is a side elevation view of the engine, parts being broken away.

Referring to the drawing the numeral 4 designates one of the cylinders of a multicylinder internal combustion automotive engine 5, 6 the pistons, 7 the crank shaft, 8 the connecting-rods operatively connecting the pistons 6 to said crank shaft and 9 the engine crank case provided with a side opening 10. According to the present invention a special side cover plate 11 is secured by bolts 12 to the crank case over the opening 10 and has an opening 13 therein and a pad portion 14 to which the base of the compressor cylinder 15 is secured by bolts 16.

The compressor is provided with the usual inlet and discharge valves and a piston 17 works in the compressor cylinder and has its wristpin 18 connected to the connecting-rod 19 in the usual manner.

The crank shaft 7 of the engine is in the present instance especially formed in that between the cranks 20 for the two intermediate power cylinders an eccentric 21 is formed and receives the adjustable big end bearing 22 of the rod 19, the crank shaft being suitably balanced to accommodate this eccentric and the rotating masses associated therewith, the eccentric providing for a reduction in stroke of the compressor as compared to the stroke of the engine.

With this construction the rotation of the crank shaft causes the reciprocation of the connecting-rod 19 and hence the piston 17, said rod working through the openings 10 and 13.

It will be further noted that the only alteration necessary to the engine is the substitution of a new crank shaft and side cover plate in order to provide an efficient drive for the compressor.

I desire it to be understood that this invention is not to be limited to any particular form or arrangement of parts except insofar as such limitations are included in the claims.

What I claim as my invention is:

1. In a multicylinder internal combustion engine, the combination with the crank case of said engine, of the crank shaft mounted in said crank case and having similarly disposed adjacent cranks for the intermediate power cylinders, a compressor drive member having an eccentricity less than the eccentricity of said cranks and disposed between said cranks, a compressor cylinder mounted on the side of the engine crank case, a piston working in said cylinder, and means including a connecting-rod operatively connecting said drive member to said piston.

2. In a multicylinder internal combustion engine, the combination with the crank case of said engine, of a crank shaft mounted in said crank case and having adjacent alined cranks for the intermediate power cylinders and an eccentric formed on said shaft having an eccentricity less than the eccentricity of said cranks and disposed between said cranks, a compressor cylinder mounted on the side of the engine crank case, a piston working in said cylinder, and means including a connecting rod operatively connecting said eccentric to said piston.

In testimony whereof, I affix my signature.

NIELS A. CHRISTENSEN.